United States Patent [19]

Geesen

[11] 4,276,117
[45] Jun. 30, 1981

[54] PROCESS OF TREATING POTASSIUM CHLORIDE BRINE BY EVAPORATION AND CRYSTALLIZATION

[75] Inventor: Donald H. Geesen, Wilcox, Canada

[73] Assignee: PPG Industries Canada Ltd., Regina, Canada

[21] Appl. No.: 152,219

[22] Filed: May 22, 1980

Related U.S. Application Data

[63] Continuation of Ser. No. 11,273, Feb. 12, 1979, abandoned.

[51] Int. Cl.$^3$ .............................................. B01D 1/26
[52] U.S. Cl. ........................... 159/47 R; 159/17 VS; 159/45; 23/302 R; 23/303; 423/184
[58] Field of Search .............. 159/DIG. 8, 45, 17 VS, 159/17 R; 23/303, 304; 423/19.5, 179, 184

[56] References Cited

U.S. PATENT DOCUMENTS

| | | | |
|---|---|---|---|
| 1,944,548 | 1/1934 | Ebner | 159/45 |
| 2,448,191 | 8/1948 | Pike | 159/45 |
| 3,202,487 | 8/1965 | Domning | 23/295 |
| 3,365,278 | 1/1968 | Kelly et al. | 23/296 |
| 3,366,419 | 1/1968 | Pasternak et al. | 159/45 |
| 3,433,603 | 3/1969 | Jeffery | 159/45 |
| 3,704,101 | 11/1972 | Kelly | 23/296 |
| 3,918,916 | 11/1975 | Garrett | 23/273 |

*Primary Examiner*—Norman Yudkoff
*Attorney, Agent, or Firm*—Irwin M. Stein; Walter M. Benjamin

[57] ABSTRACT

Disclosed is an improved method of producing potassium chloride by concentrating a brine thereof with respect to potassium chloride by multiple stage evaporation conducted at progressively higher temperatures, thereby precipitating other salts and thereafter cooling the brine in multiple stage crystallizers operated at progressively lower temperatures, thereby precipitating potassium chloride crystals. The improvement comprises cooling the brine in hotter crystallizer utilizing streams to or between cooler evaporators whereby in addition heat is provided to the evaporator stream.

8 Claims, 1 Drawing Figure

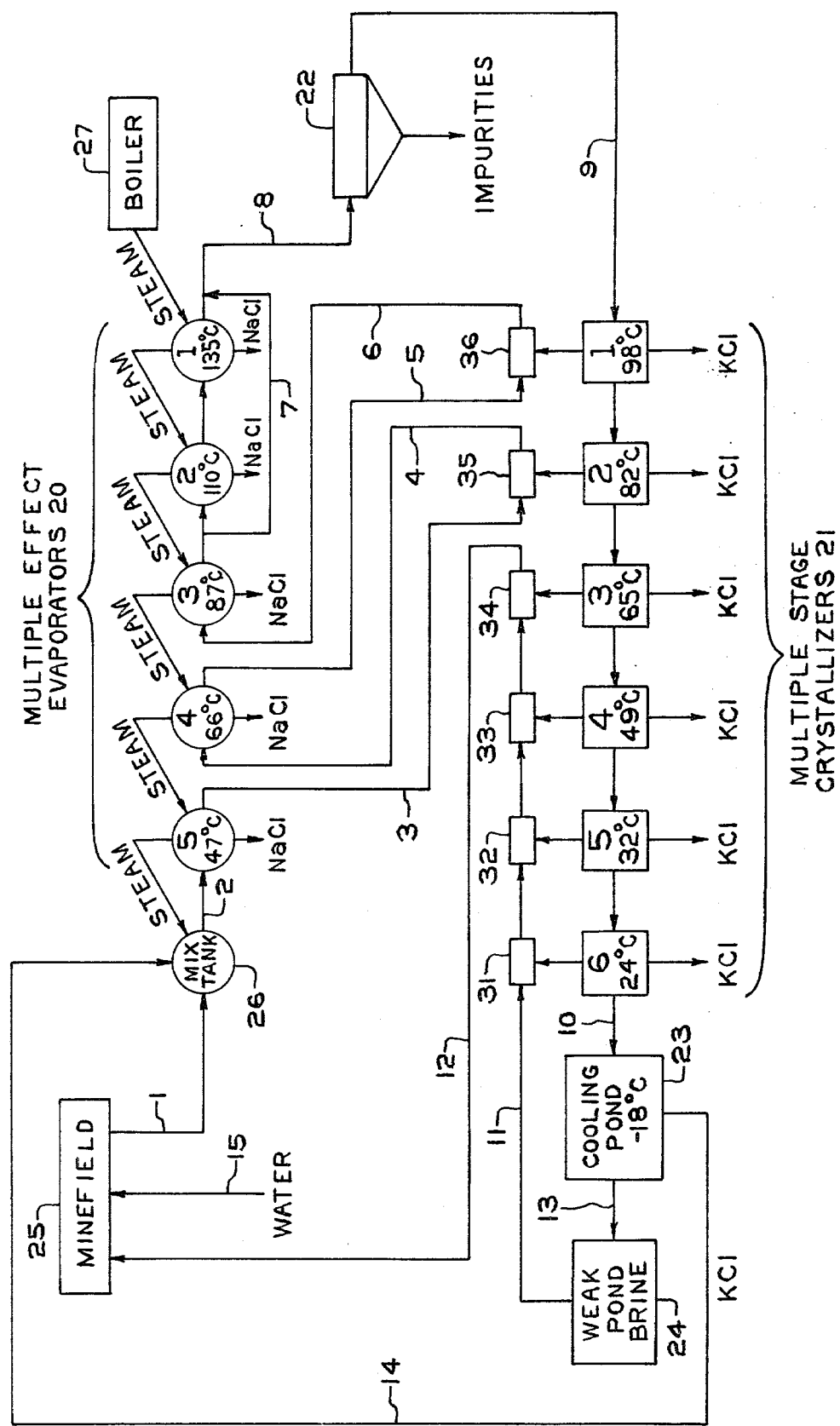

PROCESS OF TREATING POTASSIUM CHLORIDE BRINE BY EVAPORATION AND CRYSTALLIZATION

CROSS REFERENCE TO RELATED APPLICATIONS

This application is a continuation of my application Ser. No. 011,273, filed Feb. 12, 1979 for Process of Treating Potassium Chloride Brine by Evaporation and Crystallization, now abandoned.

BACKGROUND OF THE INVENTION

This invention relates to an improved method of refining potassium chloride brine by multiple stage evaporation and multiple stage crystallization and particularly relates to passing in heat exchange relationship streams in multiple effect evaporation with streams in multiple stage crystallization.

Brine containing potassium chloride typically contains also sodium chloride in admixtures therewith as well as a small amount of chlorides and sulfates of calcium and magnesium. Those brines can arise as a result of an aqueous solvent coming in contact with an ore containing potassium chloride, sodium chloride and the aforementioned impurities, as the result of a lake or other large natural body of water which has been adjacent to the ore, or as solutions of subterranean deposits of the ore which has been either shaft mined or solution mined.

Most often these brines are concentrated with respect to potassium chloride by evaporation of water therefrom at elevated temperatures and selective precipitation of the sodium chloride and other salt impurities therein. The aforesaid method of concentration can be utilized owing to the solubility of sodium chloride and other salt impurities remaining virtually constant or decreasing with increasing temperatures and owing to the solubility of potassium chloride increasing with increasing temperatures. Evaporation can be carried out at progressively higher temperatures, such as by multiple effect evaporation, whereby the brine is brought near or to saturation with respect to potassium chloride in each effect so that in the final and hottest effect the brine is highly concentrated.

An efficient method of operating multiple effect evaporators is by backward feeding. In this operation, the raw brine feed enters the last (coldest) effect. The mother liquor effluent from the last effect becomes the feed to the next to the last effect, and so on until a concentrated mother liquor is withdrawn from the first effect. Steam from an external source is condensed in the heating element of the first effect. Steam generated in the first effect is condensed in the heating element of the second effect and so on to the last effect. This gives rise to an efficacious method of evaporating a relatively cool feed, such as potassium chloride brines from the above described sources. Very high temperatures can be attained in the evaporators when they are operated well above atmospheric pressure, thereby highly concentrating the brine.

After the evaporation stage, the concentrated brine is cooled to precipitate of crystalline potassium chloride. Methods such as multiple stage evaporative crystallization are used to expediently precipitate potassium chloride from the brine. In that type of crystallization, the latent heat of vaporization is effectively provided by the sensible heat of the brine, thereby cooling the brine. Most often, the evaporative crystallizers are operated under progressively increased vacuum for each successive stage utilizing barometric condensers, which are aided by steam ejector jets in the cooler stages. The brine is passed through the crystallizers in the direction of increased vacuum. Hence, the hottest crystallizer is called the first stage and the coolest the last stage. Mother liquor effluent from the coolest stage, having been depleted of potassium chloride, can be recycled for further concentration.

The above described process is effective in producing potassium chloride crystals from its brines. However, a great amount of energy is consumed in supplying heat to evaporate water from the brine. Moreover, availability of steam for ejector jets and cooling water for barometric condensers used with crystallizers can be limited. So, it is always a desideratum that the amount of energy consumed be reduced and that the requirement of cooling water lessened even if it is only for the purpose of reducing heat pollution of natural bodies of water.

SUMMARY OF THE INVENTION

It has been found that cool raw brine feed and feed streams between multiple stage evaporators can be used as a coolant for multiple stage crystallizers. Synergistically, crystallizer streams are used as a source of heat for multiple stage evaporators. This is especially true when there is a large temperature difference between the hottest evaporator and the coolest crystallizer (e.g., where the hottest evaporator is operated above atmospheric pressure and the coolest crystallizer operated under vacuum). Since the first stage crystallizer operates at a temperature slightly below the hottest evaporator, preferably below the evaporator operated at atmospheric pressure, it can be significantly above the temperature of the coolest evaporator. Hence, feed to the cooler evaporators can be used as a coolant for the hottest crystallizer. Preferably, the feed to the coolest evaporator is used as a coolant for the coolest crystallizer possible and feed streams to the hottest evaporator are used as a coolant for the hottest crystallizer to maximize the number of crystallizers for which evaporator streams can act as a coolant. Thus, for the greater temperature difference between the coldest evaporator and the hottest evaporator, the greater number of crystallizers can be cooled using evaporator streams.

This invention has the benefit of heating feed streams to evaporators, thus recapturing part of the heat energy put into the concentrated brine while cooling the concentrated brine to precipitate potassium chloride. Hence lower end temperature multiple effect evaporation is economically enhanced by a convenient heat source which aids in progressively raising the temperature of the evaporation stream. Also, less coolant is necessary to cool crystallizer streams.

BRIEF DESCRIPTION OF THE DRAWINGS

Further benefits and advantages will become apparent in the light of the detailed description of the invention below made with reference to the drawing in which is diagrammatically illustrated five effect evaporators and six stage crystallizers and a cooling pond, all of which treat a potassium chloride brine.

DETAILED DESCRIPTION OF THE INVENTION

According to the present invention, feed streams to cooler evaporator stages of multiple stage evaporators are placed in heat exchange relationship with streams between hotter crystallizer stages of multiple stage crystallizers during the production of potassium chloride crystals from a potassium chloride brine. Preferably, feed streams to more than one evaporator are utilized to cool more than one crystallizer. It is even more preferable that the evaporator stages are backward fed multiple effect evaporators.

The potassium chloride brine treated by the present invention is relatively low in potassium chloride content. Thus, the brine is concentrated with respect to potassium chloride before appreciable values of potassium chloride are extracted therefrom. For example, the brine will contain from about 100 to about 180 grams of potassium chloride per liter. The brine usually contains more sodium chloride than potassium chloride and is often near saturation with respect to sodium chloride. A small amount, usually minor, i.e., less than 5 percent by weight, of salt impurities such as sulfates and chlorides of calcium and magnesium will also be present in the brine.

The brine is subjected to multiple stage evaporation at progressively higher temperatures whereby at each higher temperature the brine approaches saturation with respect to potassium chloride while precipitating sodium chloride and salt impurities. These solids are removed from the bottom of the evaporator in the form of a slurry. The mother liquor associated with the slurry is recycled back to the evaporators. The precipitating sodium chloride can be elutriated so that other precipitated salt impurities are carried over with mother liquor to the succeeding evaporator while relatively pure sodium chloride is removed from the bottom of the evaporator.

The multiple stage evaporators can be multiple effect evaporators which are preferably backward fed because the raw feed is typically relatively cold, e.g., 20° C., to 50° C. Thus, the last evaporator effect can be operated under vacuum, e.g., at 46 mm mercury and 47° C. The first evaporator effect can be operated at superatmospheric pressure, e.g., at 1602 mm mercury and 135° C. A large working temperature difference is thereby provided for an efficient operation. Moreover, since the solubility of potassium chloride is temperature dependent, a more highly concentrated solution is attained at the higher temperatures. Further, potassium chloride can be precipitated from the concentrated solution starting with a higher temperature in the crystallizers, thereby producing a larger, stronger and more pure crystal.

The concentrated brine effluent from the evaporator can be either fed directly to the crystallizers or fed to a thickener wherein precipitated salt impurity fines are allowed to settle. Thus, when salt impurities are present in the evaporator effluent (where virtually all precipitated salt impurities are not removed with the precipitated sodium chloride), they are preferably removed in a settler such as a thickener. A flocculating agent can be added to the thickener to facilitate settling of extremely fine crystals. Otherwise, the precipitated salt impurities would have to be separated in a step subsequent to crystallization of potassium chloride.

On the other hand, where the effluent from the evaporators contains virtually no precipitated impurities, the effluent is fed directly to the crystallizers. This is made possible by mechanically removing all impurities such as by large still zones in the evaporators or by high efficiency cyclones. In this latter case, the first stage crystallizer can be operated at a higher temperature than when the effluent is fed to the thickener, because the thickener operates at atmospheric pressure and should not be unduly agitated. Thus, the feed to and from the thickener should be at or near atmospheric pressure and at 110° C. This is in contrast to the overflow from an evaporator effect operated at superatmospheric pressure, and for example at about 135° C., which can be fed directly to the crystallizers. In the former case, the first crystallizer is operated at about 98° C. as contrasted with about 123° C. for the latter case. When the evaporator effluent contains less than about 0.5 percent by weight precipitated impurities, it may be practical to remove the salt impurities in a step subsequent to crystallization, such as by washing the potassium chloride crystals with a solution saturated with respect to potassium chloride. But, when the solution contains more than about 0.5 percent by weight of precipitated impurities, it may be impractical to remove such impurities subsequent to crystallization.

The effluent brine, which is withdrawn from the evaporators and which may or may not have been treated by a thickener, is progressively cooled in a multiple stage crystallizer. It is preferred that the crystallizer be the evaporative type, whereby the sensible heat of the solution is absorbed via the latent heat of vaporization necessary to evaporate water from the brine. It is also preferred that the evaporation take place at progressively increased vacuum. The vacuum can be accomplished utilizing barometric condensers and steam ejector jets in the cooler stages. An aqueous diluent unsaturated with respect to sodium chloride and other salt impurities is added to each evaporative crystallizer to avoid the solubilities of such salts from being exceeded, thereby precipitating and contaminating the potassium chloride product. The coldest crystallizer can be cooled by being in direct or indirect heat exchange relationship with a refrigerant which is recycled, compressed and condensed for reuse.

According to a preferred embodiment of the present invention, feed to cooler evaporators is utilized as the coolant in the shell and tube condensers of the hotter evaporative crystallizers. This is preferred because sensible heat of evaporator feed is increased via the latent heat of condensation of steam from the evaporative crystallizers (the aforementioned preferred method of crystallization). However, it is within the contemplation of the present invention that feed to cooler evaporators is used in other ways to aid in the cooling of the hotter crystallizers of other types, such as a use as a coolant for condensing a refrigerant or as a coolant in an indirect contact heat exchanger with crystallizer liquor. A novel aspect of the present invention arises due to potassium chloride brine from which potassium chloride is produced being of such a nature that it can be heated and cooled in multiple staged steps whereby streams in the heating step can be synergistically placed in heat exchange relationship with streams in the cooling step.

Reference is now made to the FIGURE which illustrates an embodiment of the present invention. Brine 1 from minefield 25 is mixed in mix tank 26 with potassium chloride 14 precipitated in cooling pond 23 and fed via stream 2 to the fifth effect of multiple effect evaporators 20. Steam from the fifth effect is utilized for heating the mixture in mix tank 26. The brine is concentrated in the fifth effect until it reaches saturation with respect to potassium chloride as sodium chloride and salt impurities are precipitated. The overflow stream 3 from the fifth effect is passed through shell and tube condenser 35 of the second stage crystallizer of multiple stage crystallizers 21 thereby acting as a coolant therein and then back to the fourth effect evaporator via stream 4 as feed thereto. It should be noted here that the second stage crystallizer is operated at 82° C. and the fifth evaporator effect overflow 3 is at 47° C., sufficiently low enough to act as a coolant.

The brine is concentrated further with respect to potassium chloride in the fourth evaporator effect of multiple effect evaporators 20 at 66° C. and the overflow 5 therefrom is utilized as a coolant in condenser 36 of the first stage crystallizer of multiple stage crystallizers 21 and returned via stream 6 as feed to the third evaporator effect.

The overflow from the third effect is fed into the second effect. The overflow from the second effect is fed to the first effect. The first evaporator effect is heated by steam from boiler 27 and that effect produces steam which heats the second effect and so on to the fifth effect, the steam from which heats the mix tank 26. Since the first evaporator effect is operated 25° C. above the atmospheric boiling point temperature of the concentrated brine therein, a portion of the overflow from the third effect is mixed via stream 7 with the overflow from the first effect to produce a mixture 8 which is at its atmospheric boiling point. This mixture 8 is fed into thickener 22 and the overflow 9 from thickener 22 is fed into the first stage of multiple stage crystallizers 21.

The first stage crystallizer cools thickener overflow to 98° C. by the shell and tube condenser 36 which is cooled by stream 5 from the fourth evaporator effect, thereby precipitating potassium chloride. Likewise, the overflow from the first stage crystallizer is cooled in the second stage crystallizers to 82° C. by the shell and tube condenser 35 which is cooled by stream 3 from the fifth evaporator effect, thereby precipitating further potassium chloride.

Additional potassium chloride is precipitated in crystallizer stages 3, 4, 5 and 6 which are cooled to 65° C., 49° C., 32° C. and 24° C. by barometric condensers 34, 33, 32 and 31, respectively, using stream 11 taken from weak brine pond 24 during the cooler months of the year. During the summer or other warmer months, barometric condenser 31 may be cooled by a source cooler than stream 11, which would be fed directly into barometric condenser 32. Enough aqueous diluent unsaturated with respect to sodium chloride and salt impurities is fed into each crystallizer stage to avoid precipitation of sodium chloride and the salt impurities therein. Ejector jets are used to create progressively increased vacuums on the cooler crystallizer stages so that evaporation in the various stages will cool the solutions therein to the aforementioned temperatures.

Mother liquor effluent from the sixth stage of multiple stage crystallizers 21 is fed via stream 10 into cooling pond 23 which is cooled at least to −18° C. during the winter after which mother liquor is drawn off into weak brine pond 24 via stream 13. Potassium chloride precipitated in cooling pond 23 is mixed with effluent 1 from minefield 25 in mix tank 26. Weak brine pond liquor 11 is fed through barometric condensers 31, 32, 33 and 34 and recycled back to minefield 25 for further dissolving of ore along with water stream 15.

It can be seen that in the configuration of the FIGURE that the feeds to evaporator effects four and three can be utilized as coolants for the shell and tube condensers 35 and 36 of crystallizer stages 2 and 1, respectively, because in both cases the temperature difference is at least 33° C. Also, because of that same temperature difference, streams 4 and 6 are heated and require low heat input into evaporator effects four and three, respectively. Further, stream from the fifth evaporator effect, which is normally condensed for use as a coolant in crystallizers, is used to heat the mixture in mix tank 26.

Although the present invention has been described with respect to various embodiments, it is not intended that these embodiments be limiting except to the extent those limitations are cited in the claims.

What is claimed is:

1. In a method of producing potassium chloride from a brine thereof by concentrating the brine with respect to potassium chloride by multiple effect evaporators operated at progressively higher temperatures, wherein the multiple effect evaporators are backward fed, and then cooling the concentrated brine in multiple stage evaporative crystallizers operated at progressively lower temperatures, thereby precipitated potassium chloride crystals, the improvement which comprises cooling the brine in the hotter crystallizers of said multiple stage evaporative crystallizers utilizing feed streams to or feed streams between the cooler evaporators of said multiple effect evaporators, thereby heating the feed streams between the cooler evaporators.

2. The method of claim 4 wherein the evaporative crystallizers are cooled by shell and tube condensers in which the feed streams to or feed streams between the cooler evaporators are used as the coolant therein.

3. In a method of producing potassium chloride from a brine thereof by concentrating the brine with respect to potassium chloride by multiple effect evaporators operated at progressively higher temperatures, said multiple effect evaporators being backward fed, and then cooling the concentrated brine in multiple stage evaporative crystallizers operated at progressively lower temperatures, thereby precipitating potassium chloride crystals, the improvement which comprises passing overflow from the coolest evaporator effect in indirect heat exchange relationship with brine in the second stage crystallizer and passing overflow from the evaporator effect succeeding the coolest evaporator effect in indirect heat exchange relationship with brine in the first stage crystallizer, thereby cooling the brine in said crystallizers and heating the overflow from said evaporators.

4. The method of claim 3 wherein the multiple effect evaporators contain five effects and the multiple stage crystallizers contain six stages, and overflow from the fifth effect evaporator cools brine in the second stage crystallizer and overflow from the fourth effect evaporator cools brine in the first stage crystallizer.

5. In a method of producing potassium chloride from a brine thereof by concentrating the brine with respect to potassium chloride by multiple effect evaporators operated at progressively higher temperatures, said multiple effect evaporators being backward fed, and then cooling the concentrated brine in multiple stage evaporative crystallizers operated at progressively lower temperatures, thereby precipitating potassium chloride crystals, the improvement which comprises cooling brine in the second stage crystallizer with overflow from the coolest evaporator effect thereby heating said evaporator effect overflow.

6. The method of claim 5 wherein, in addition, brine in the first stage crystallizer is cooled with overflow from the evaporator effect succeeding the coolest evaporator effect.

7. In a method of producing potassium chloride from a brine thereof by concentrating the brine with respect to potassium chloride by multiple effect evaporators operated at progressively higher temperatures, said multiple effect evaporators being backward fed, and then cooling the concentrated brine in multiple stage evaporative crystallizers operated at progressively lower temperatures, thereby precipitating potassium chloride crystals, the improvement which comprises cooling brine in the first stage crystallizer with overflow from the evaporator effect succeeding the coolest evaporator effect.

8. The method of claims 5, 6, or 7 wherein the overflow from the evaporator effect is passed in indirect heat exchange relationship with the brine to be cooled in the crystallizer.

* * * * *